United States Patent
Choi et al.

(10) Patent No.: US 7,295,521 B2
(45) Date of Patent: Nov. 13, 2007

(54) DIRECTIONAL FLOODING METHOD IN WIRELESS SENSOR NETWORK

(75) Inventors: Jong Mu Choi, Gunpo (KR); Jai Hoon Kim, Yongin (KR); Young Bae Ko, Gunpo (KR)

(73) Assignee: AJOO University Industry Cooperation Foundation (KR)

( * ) Notice: Subject to any disclaimer, the term of this patent is extended or adjusted under 35 U.S.C. 154(b) by 560 days.

(21) Appl. No.: 10/911,370

(22) Filed: Aug. 4, 2004

(65) Prior Publication Data

US 2006/0013154 A1   Jan. 19, 2006

(30) Foreign Application Priority Data

Jul. 16, 2004   (KR) ............... 10-2004-0055682

(51) Int. Cl.
*H04J 1/16* (2006.01)
(52) U.S. Cl. ............... 370/238; 370/252; 370/338; 455/403; 455/456
(58) Field of Classification Search ............... 370/238, 370/252, 338, 349, 330, 332, 340; 455/403, 455/456.1, 456.3
See application file for complete search history.

(56) References Cited

U.S. PATENT DOCUMENTS

| | | | | |
|---|---|---|---|---|
| 4,769,815 A | * | 9/1988 | Hinch et al. ............... 370/236 |
| 5,235,599 A | * | 8/1993 | Nishimura et al. ............ 714/4 |
| 5,781,534 A | * | 7/1998 | Perlman et al. ............. 370/248 |
| 6,108,708 A | * | 8/2000 | Iwata ......................... 709/238 |
| 6,628,620 B1 | * | 9/2003 | Cain ........................... 370/248 |
| 6,718,394 B2 | * | 4/2004 | Cain ........................... 709/242 |
| 6,870,846 B2 | * | 3/2005 | Cain ........................... 370/392 |
| 6,977,938 B2 | * | 12/2005 | Alriksson et al. ........... 370/401 |
| 7,123,925 B2 | * | 10/2006 | Robinson et al. ......... 455/456.1 |
| 2003/0202465 A1 | * | 10/2003 | Cain ........................... 370/225 |
| 2005/0073992 A1 | * | 4/2005 | Lee et al. ..................... 370/351 |
| 2005/0282554 A1 | * | 12/2005 | Shyy et al. ................... 455/450 |
| 2006/0245424 A1 | * | 11/2006 | Ramanathan et al. ....... 370/389 |

* cited by examiner

*Primary Examiner*—Matthew Anderson
*Assistant Examiner*—Minh Dao
(74) *Attorney, Agent, or Firm*—Ober/Kaler; Royal W. Craig

(57) ABSTRACT

The present invention relates to a directional flooding method in a wireless sensor network. Transfer of a packet between respective sensor nodes and a sink node in a wireless sensor network is made with the directivity. To this end, when the packet is transmitted from the sensor nodes to the sink node, only the sensor nodes having a minimum hop count for the sink node are involved in transmission of the packet. Meanwhile, if the packet is sent from the sink node to the sensor nodes within a given destination area, after the packet reaches a corresponding destination area, only sensor nodes located within the destination area transmit the packet. The present invention has an effect that it can improve energy consumed on average and a total number of packets transmitted when transmitting the packets in a wireless sensor network compared to a conventional simple flooding method.

4 Claims, 5 Drawing Sheets

(a)    (b)

(a)

(b)

(c)

(d)

(e)

(f)

DIRECTIONAL FLOODING METHOD IN WIRELESS SENSOR NETWORK

BACKGROUND OF THE INVENTION

1. Field of the Invention

The present invention relates to a directional flooding method in a wireless sensor network in which packets transferred between respective nodes are induced toward a destination direction through directional information, thus obviating transmission of unnecessary packets to allow for efficient transmission of the packets.

2. Background of the Related Art

A wireless sensor network recently attracts academic interests due to its several unique characteristics different from a wireless ad hoc network. For example, in the wireless sensor network, a great number of sensor nodes having very limited energy and computing resources are crowded to form a network. Furthermore, each of the sensor nodes usually does not have a global identification such as an IP address.

The wireless sensor network is, however, still considered as a kind of the ad hoc wireless network. This is because the two networks are very similar in terms of various points. For instance, the sensor network and the ad hoc network are self-configured and self-maintained independently without intervention from the outside. They are also similar in that transmission of packets is accomplished through multi-hop of a wireless link (multi-hop routing). In the mobile ad hoc network, researches on a routing protocol have been actively made. There already exist several protocols.

On the contrary, in the wireless sensor network, lots of attention to routing from a sensor node to a sink node (data dissemination) has recently been paid. In the above, the sink node refers to a node that transfers data sensed in the sensor network to a person, or is connected to a base network to transfer data.

Routing methods in the wireless ad hoc network or the wireless sensor network are mostly based on flooding. They have a problem that the cost is high. Furthermore, in most MAC protocols used in the mobile ad hoc network and the wireless sensor network, CSMA/CA for sensing carriers and supporting multiple access of a medium in order to avoid collision is used. Thus, if several neighboring nodes broadcast at the same time, the network can fall into a severe contention state. Broadcasting that is unnecessarily overlapped with this contention state and collision of signals may cause a broadcast storm problem.

Therefore, this simple flooding scheme needs to be improved in a more effective manner. In the ad hoc network environment, researches for solving this problem have been made and several algorithms have been proposed. Ideas on which these algorithms are based are to form an optimal broadcast tree so that packets can be transferred from a source to all nodes within the network.

However, the method of forming this optimal tree may be improper since unnecessary overhead is generated in the wireless sensor network environment. This is because data packets need not to be transmitted to all nodes within the network in the sensor network. In particular, it is sufficient that data sensed by common sensors are usually transmitted to a single destination node, i.e., only a sink node.

It will be examined how the methods that are searched so far in the mobile ad hoc network environment for more efficient flooding can be optimal solutions even in the wireless sensor network.

For example, in order to minimize defects of flooding called the broadcast storm, several methods in which the simple flooding method is modified a little have been proposed under an ad hoc network environment. Most of these methods are for minimizing the number of packets transmitted in the whole flooding process on the basis of ideas that an optimal broadcast tree is generated.

A method of simply flooding all the nodes and a method of using an optimal flooding tree will now be compared with reference to FIG. 1.

As shown in FIG. 1(a), if a simple flooding scheme is used, all nodes have to send packets in order to transmit packet once. Such a simple flooding scheme can transmit the packet very reliably, but requires high cost. For example, in FIG. 1(a), a total of 25-packet transmissions occurs.

For more efficient flooding, it is required that an optimal broadcast tree be found in order to minimize the number of packets transmitted. Even in this case, the packet sent by the source node can be still transferred to all the nodes. In FIG. 1(b), only 12 transmissions are required in order to transmit the packets to all the nodes.

However, a document "W. Liang" constructing Minimum-Energy Broadcast Trees in Wireless Ad Hoc Networks, "in *proc. of ACM Mobihoc* '02, pp. 112-123, June 2002." demonstrates that a problem to find such an optimal broadcast tree is NP-complete. Accordingly, for an efficient flooding method, an alternative solution capable of forming a form close to the optimal broadcast tree was proposed.

For example, there were proposed a method in which an intermediate node determines whether to broadcast a packet again with a predetermined probability, a method in which the intermediate node uses a pre-calculated coverage and a method in which the intermediate node selectively floods by determining whether to transmit a packet using information on neighboring nodes. These methods have their objects to form a tree that can be broadcast more efficiently using an adaptive and heuristic algorithm.

Meanwhile, in the wireless sensor network, it is highly probable that the flooding method for forming this optimal broadcast tree cannot be the most effective flooding method. Forming the optimal broadcast tree is for meeting a premise that the packet has to be transferred to all the nodes in the network. This is because the premise itself is unnecessary in the wireless sensor network.

The purpose of flooding in the wireless sensor network is not to transfer the packet to all the nodes but to a single or several destination nodes like Unicast or Geocast. This means that transmission of the packet using the flooding method may have the directivity toward a specific destination node.

FIG. 2 shows a tree formed by a directional flooding method. In order to transmit a packet from a source node to a destination node, only four transmissions are enough.

Documents [C. Intanagonwiwat, R. Govinda, D. Estrin, and J. Heidemann, "Directed Diffusion for Wireless Sensor Networking," in *IEEE/ACM Transaction on Networking*, Vol. 11, No. 1, pp. 2-16, February 2003], [F. Ye, G. Zhong, S. Lu, L. Zhang, "GRAdient Broadcast: A Robust Data Delivery Protocol for Large Scale Sensor Networks," to appear at the *ACM WINET Journal*.], etc. disclose recent researches in association with efficient transmission of data in the wireless sensor network.

These methods determine whether to transmit the packet or not based on routing cost.

If the type of a network is frequently changed, however, these protocols require that information on neighboring nodes be updated on a regular basis. This may result in lots of overhead in the number of packets, energy consumption and delay.

SUMMARY OF THE INVENTION

Accordingly, the present invention has been made in view of the above problems, and it is an object of the present invention to allow flooding of a packet to be accomplished in the direction that approaches a destination node based on directional information. It is therefore possible to obviate transmission of unnecessary packets and to reduce the whole energy consumption.

1. If a packed is to be sent from sensor nodes to a sink node, a directional flooding method according to the present invention can be preferably implemented by the following steps 1-1 to 1-4:

1-1) allowing the sink node to inform the respective sensor nodes of its positional information;

1-2) allowing the respective sensor nodes to calculate a minimum hop count between themselves and the sink node;

1-3) allowing the respective sensor nodes that wants to transmits a packet to the sink node to put information on the minimum hop count into a corresponding packet and then to broadcast the packet to the sink node as the destination; and 1-4) allowing the respective sensor nodes that received the packet to compare their minimum hop counts and a minimum hop count written into the packet, if the minimum hop counts of the respective sensor nodes are smaller than the minimum hop count written into the packet, the respective sensor nodes write their minimum hop counts into the packet and then broadcast the packet, and if the minimum hop counts of the respective sensor nodes are not smaller than the minimum hop count written into the packet, the respective sensor nodes discard a corresponding packet, wherein this step is repeated until the packet reaches the sink node.

2. If a packed is to be sent from a sink node to sensor nodes within a given destination region, a directional flooding method according to the present invention can be preferably implemented by the following steps 2-1 to 2-3:

2-1) allowing the sink node to broadcast a packet with a central coordinate of a destination area, coordinates of the destination area, and a region flag indicating whether the packet reaches the destination area contained in the packet;

2-2) transmitting the packet sent by the sink node to the respective sensor nodes located within the destination area, and then allowing the sensor nodes located in the destination area to set the region flag if the region flag of the packet is not set; and 2-3) allowing the respective sensor nodes that received the packet set in the region flag to broadcast the packet if the respective sensor nodes are located within the destination area, and to disregard the packet if the respective sensor nodes are not located within the destination area, wherein this step is repeated until the packet is transmitted to every respective sensor nodes located within the destination area.

At this time, even when the packet is to be sent from the sink node to the sensor nodes within a given destination area, only sensor nodes nearest to the destination can participate in transmission of the packet through the minimum hop count up to the destination area.

BRIEF DESCRIPTION OF THE DRAWINGS

Further objects and advantages of the invention can be more fully understood from the following detailed description taken in conjunction with the accompanying drawings in which.

DETAILED DESCRIPTION OF THE PREFERRED EMBODIMENT

The present invention will now be described in detail in connection with preferred embodiments with reference to the accompanying drawings.

An embodiment that a packet is transmitted from given sensor nodes to a sink node will be explained with reference to FIG. 3.

In a flooding method according to the present invention, each of sensor nodes determines whether to flood based on directional information toward a destination node. To this end, it is required that each sensor node be constructed to know its position. For example, the sensor node may use positional information through a GPS receiver.

A sink node initially informs the respective sensor nodes of its positional information (S31).

It is assumed that the sink node is rarely moved. Thus, what the sink node informs each sensor node of its positional information can be performed only once when a wireless sensor network is initially formed. Each of the sensor nodes that received the positional information from the sink node can calculate a minimum hop count between its position and the sink node since it can know its position (S32). That is, it is possible to easily calculate the minimum hop count of each of the sensor nodes based on positional information on a corresponding sensor node and a sink node and a transmission range of the sensor node.

Meanwhile, sensor nodes that want to transmit given packets to the sink node puts the minimum hop count information into corresponding packets, set a destination to the sink node and then transmit the packets (for example, broadcast) (S33).

The packets sent by the sensor nodes are transmitted to the sink node being the final destination via different sensor nodes (S34).

The operation performed in each sensor node regarding step S34 will now be described in detail. Each sensor node that received the packet compares its minimum hop count and the minimum hop count written into the packet (S34-1 and S34-2). If the minimum hop count of the sensor node is smaller than the minimum hop count written into the packet, the sensor node writes its minimum hop count into a corresponding packet and then broadcasts the packet again (S34-3 to S34-5). If the minimum hop count of the sensor node is not smaller than the minimum hop count written into the packet, the sensor node disregards (discard) the corresponding packet (S34-3 and S34-6). Accordingly, since only a sensor node nearest to the sink node participates in transmission of the packet, the packet can be transferred with the directivity toward the sink node and transmission of unnecessary packets can be obviated.

Figure 4:
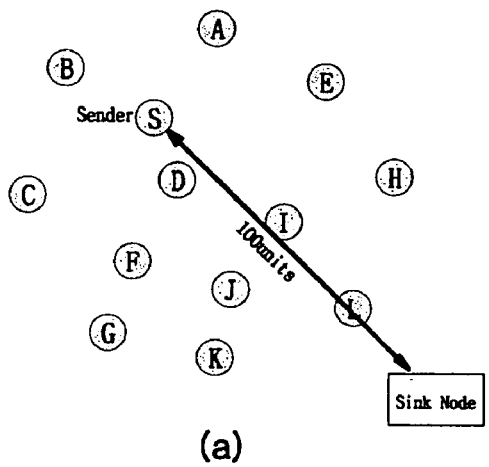
FIG. 4 shows an exemplary operational process of directional flooding according to a first embodiment of the present invention.
Figure 4:
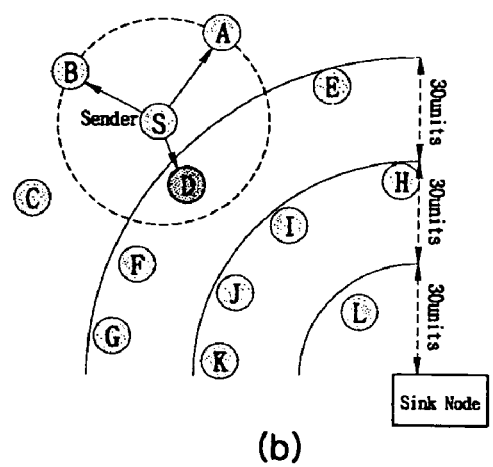
Figure 4:
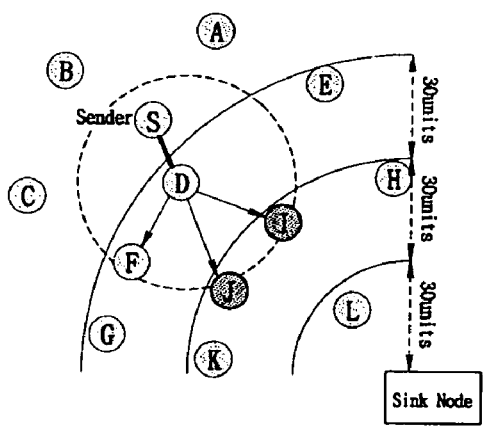
Figure 4:
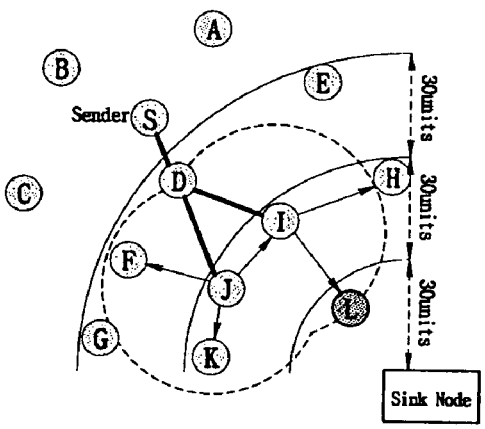
Figure 4:
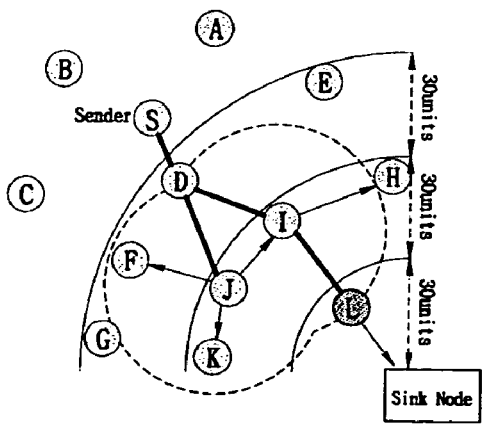
Figure 4:
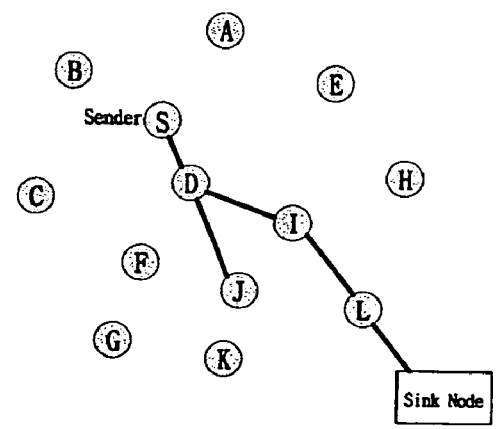

In order to facilitate understanding, a detailed example of a process in which flooding is accomplished according to the present invention will be described with reference to FIG. 4.

FIG. 4(a) shows an example that sensor nodes A to L and S and one sink node exist. The sensor node S is a source node that tries to send a given packet to the sink node. At this time, it is assumed that the distance between the source node S and the sink node is 100 and a maximum transmission range of each sensor node is 30. Therefore, the source node S determines that the minimum hop count up to the sink node is 4 based on positional information of the sink node that is initially known.

Referring to FIG. 4(b), if neighboring nodes A, B and D that are spaced by one hop from the source node S receive the packets, only the sensor node D has a hop count 3 that is smaller than the minimum hop count 4 of the packet. Thus, only the sensor node D can broadcast the packet again. On the contrary, since the sensor nodes A and B do not have the hop count smaller than 4, they do not broadcast the received packets again.

Referring to FIG. 4(c), there is indicated a first path between the source node S and the sensor node D. The sensor node D broadcasts a packet by setting the minimum hop count of the packet to 3 being its hop count. If neighboring nodes F, I and J within one hop from the sensor node D receive the packet, only the sensor nodes I and J can broadcast the packet again since they have a hop count 2 smaller than the minimum hop count 3 of the current packet. However, the sensor node F cannot broadcast the packet again since it does not have a hop count smaller than 3.

Referring to FIG. 4(d), there is indicated a second path between the sensor nodes D and I and the sensor nodes D and J. The sensor nodes I and J broadcast packets by setting the minimum hop count of the packet to 2 being its hop count. Accordingly, as described above, only the sensor node L can broadcast the packet again since it only has a hop count 1 smaller than the minimum hop count 2 of the current packet. On the contrary, sensor nodes F, K, etc. cannot broadcast the received packets again since they have the hop count smaller than 2.

Referring to FIG. 4(e), there is indicated a third path between sensor nodes I and L. The sensor node L broadcasts a packet by setting the minimum hop count of the packet to 1 being its hop count. At this time, the sensor node L has the minimum hop count 1. Thus, the packet broadcasted by the sensor node L reaches the sink node being an original destination.

According to this process, as shown in FIG. 4(f), the packet is transmitted along the path from the source node S to the sink node (thick line). That is, directional flooding is accomplished. Thus, it can be seen that only four nodes D, I, J and L among 12 nodes around the source node S participated in the flooding process.

An embodiment of the present invention that the packet is transmitted from the sink node to the sensor node will now be described. An example that the packet is transmitted from the sink node to the sensor node may include a case where its positional information is initially informed, a case where a packet requesting the sensed data is sent, as described above.

In this embodiment, it is required that the sink node be constructed so that it knows the position of a destination area to which the sink node tries to send a packet. (An example: Transmission of a packet that requests average temperature in the southeast).

Figure 5:
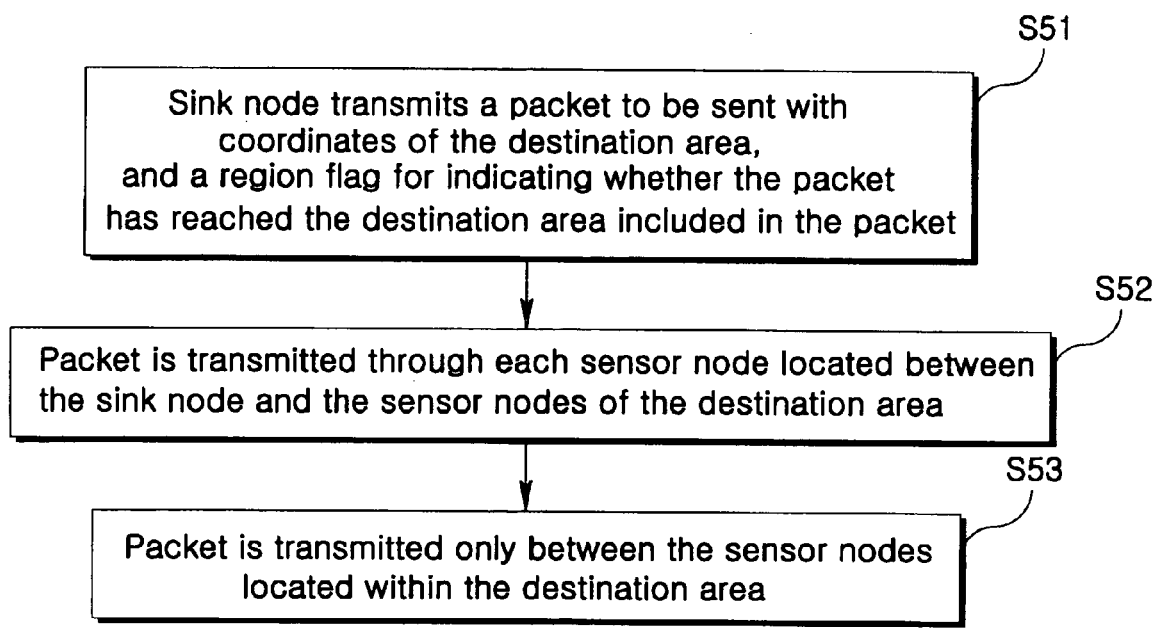
FIG. 5 is a flowcharts showing a directional flooding method according to a second embodiment of the present invention.

Referring to FIG. 5, a sink node that tries to send a packet to given sensor nodes transmits central coordinates of a destination area (although the destination area is shown in a rectangular form, it may differ depending on GPS coordinates, etc.), coordinates of the destination area, and a region flag indicating whether a packet has reached the destination area, with them contained in the packet (S51).

The packet is transmitted to respective sensor nodes within the destination area through the respective sensor nodes located between the sink node and the destination area by using any Flooding method (S52). If the packet reaches the destination area, simple flooding is accomplished only among the sensor nodes within the destination area (S53).

Figure 6:
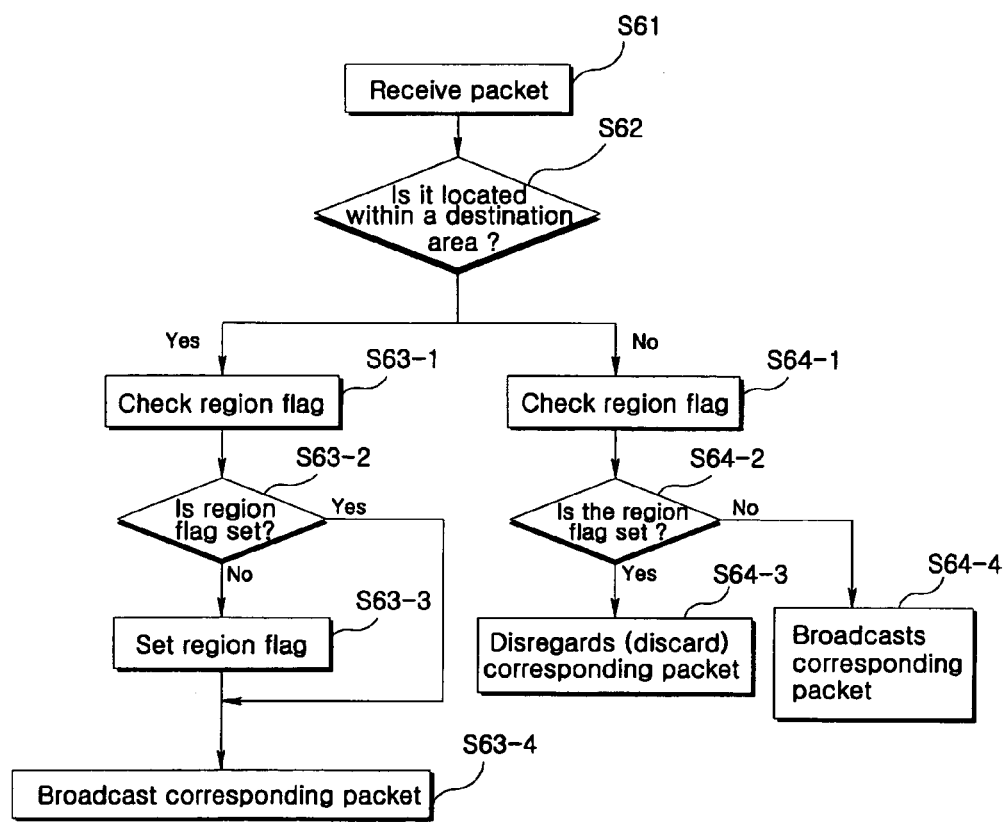
FIG. 6 is a flowcharts showing the operation in each sensor node according to a second embodiment of the present invention.

For this purpose, the respective sensor nodes operate as shown in FIG. 6.

If the sensor node receives a packet, the sensor node determines whether it is located within the destination area written into the packet (S61 and S62). If it is determined that the sensor node is located within the destination area, the sensor node checks a region flag contained in the packet (S63-1). If the region flag is not set, the sensor node sets the region flag (S63-3) and broadcasts a corresponding packet to neighboring nodes (S63-4). At this time, setting the region flag means that the packet already reaches the destination area.

Meanwhile, if it is determined that the sensor node is not located within the destination area written into the packet in step S62 (S64-1), the sensor node determines whether the region flag of the packet is set (S64-2). If it is determined that the region flag is set, the sensor node disregards (discards) a corresponding packet (S64-3). If it is determined that the region flag is not set, the sensor node broadcasts the corresponding packet to a neighboring node (S64-4).

That is, regarding the packet that already reached the destination area, simple flooding is accomplished among the respective sensor nodes within the destination area, but the packet is not further transmitted among the respective sensor nodes outside the destination area.

Figure 7:
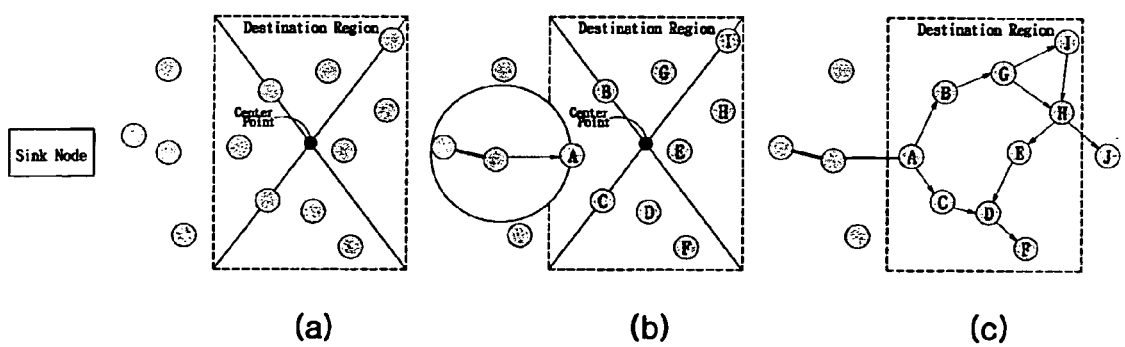
FIG. 7 shows an exemplary operational process of directional flooding according to a second embodiment of the present invention.

In order to facilitate understanding, a detailed example will now be described with reference to FIG. 7.

Referring to FIG. 7(a), a sink node transmits a packet to central coordinates of a destination area and the packet is transmitted through respective sensor nodes between the sink node and the destination area.

As shown in FIG. 7(b), if a sensor node A within the destination area receives the packet, it indicates that it has already reached the destination area by setting the region flag of the packet and then broadcasts the packet again to a neighboring node.

If the region flag is indicated, simple flooding is accomplished within the destination area so that the packet can be transmitted to all the sensor nodes, as shown in FIG. 7(c). That is, sensor nodes located within the destination area broadcast received packets to other neighboring nodes again. Sensor nodes located outside the destination area disregard the packet.

Figure 1:
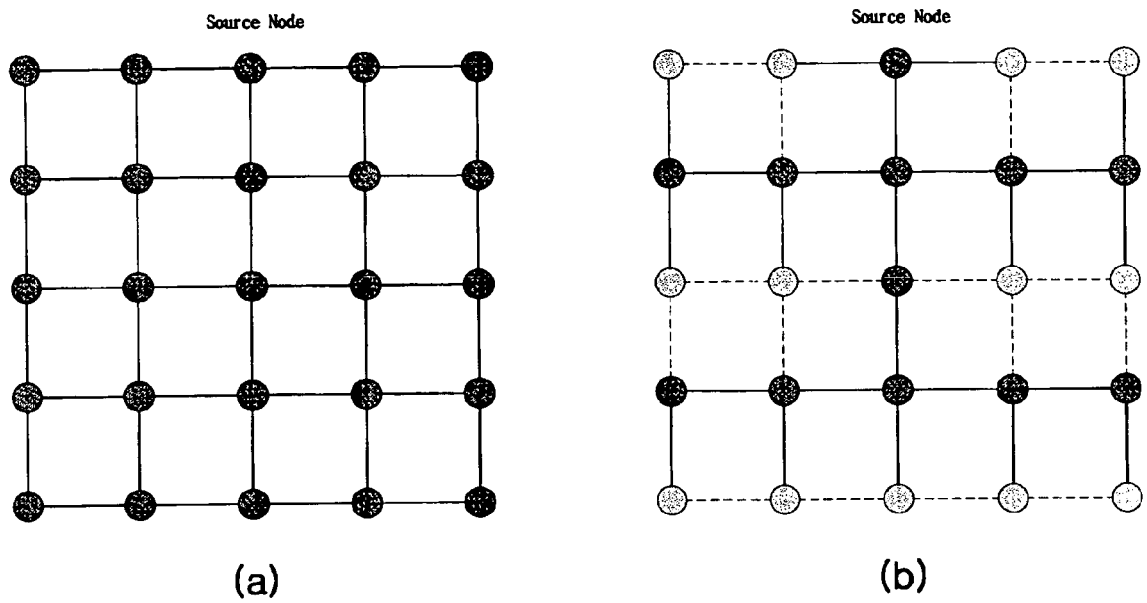
FIG. 1 shows the concept of a flooding tree.
Figure 2:
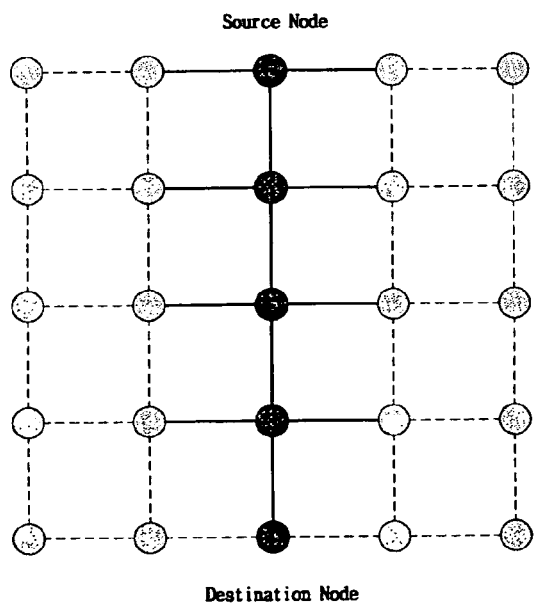
FIG. 2 shows the concept of a directional flooding tree.
Figure 3:
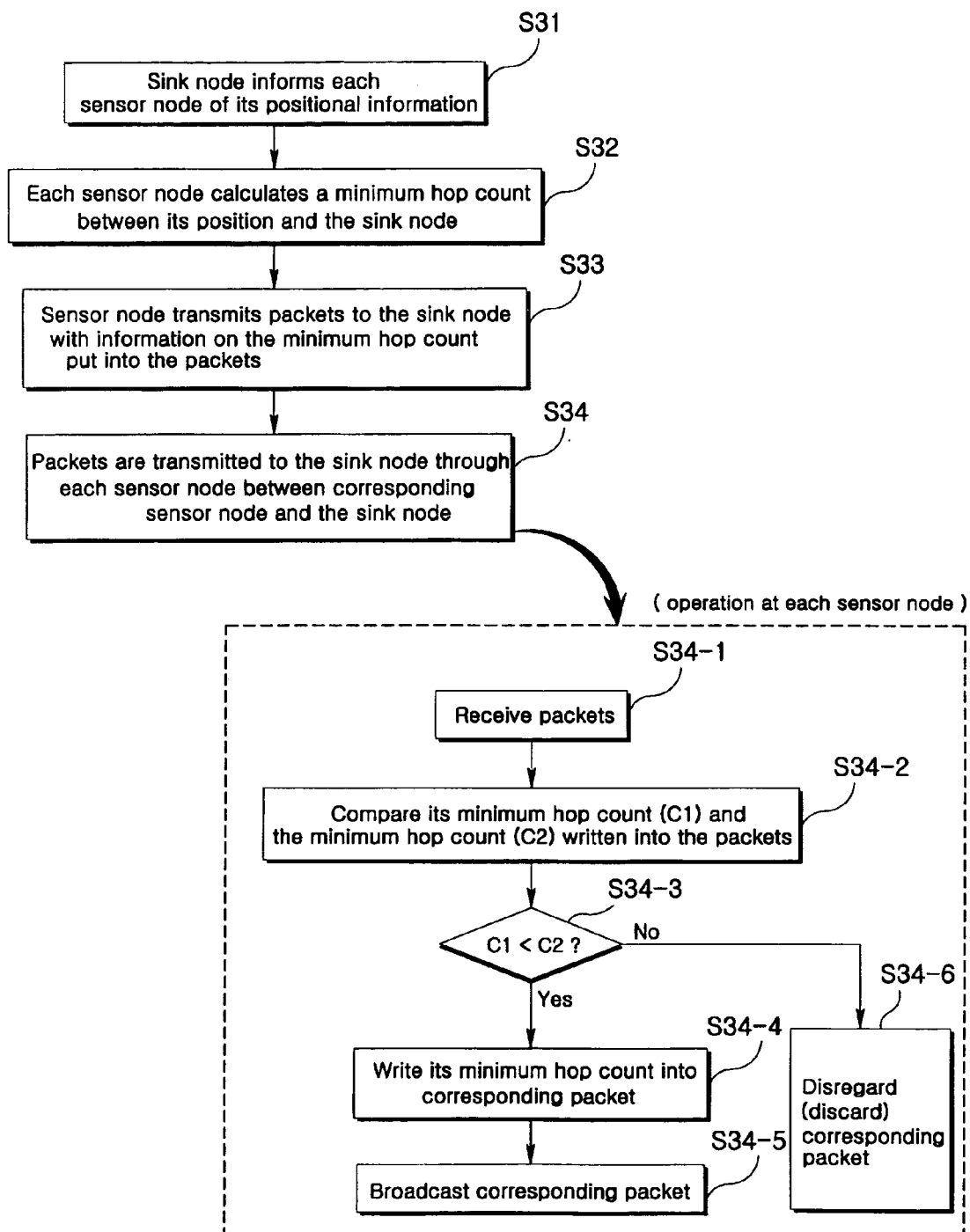
FIG. 3 is a flowcharts showing a directional flooding method according to a first embodiment of the present invention.

Meanwhile, the flooding method shown in FIG. 3 can be applied to even an embodiment that a packet is transmitted from a sink node to a given destination area.

That is, the sink node that tries to send a packet calculates a minimum hop count up to a destination area and sends this information with it contained in the packet.

Each sensor node that broadcasts the packet compares its minimum hop count up to the destination area, which is contained in the packet, and the minimum hop written into the packet based on its positional information. If the minimum hop count of each sensor node is smaller than the minimum hop written into the packet, the sensor node writes its minimum hop count into a corresponding packet and broadcasts the packet. If the minimum hop count of each sensor node is not smaller than the minimum hop written into the packet, the sensor node discards a corresponding packet. Accordingly, the packet can be moved along an optimal path up to the destination area.

The present invention has an effect that it can improve energy consumed on average and a total number of packets transmitted when packets are transmitted in a wireless sensor network, compared to a conventional simple flooding method.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A directional flooding method between respective sensor nodes and a sink node in a wireless sensor network in which the respective sensor nodes are constructed to know their positions, comprising the steps of:

allowing the sink node to inform the respective sensor nodes of its positional information;

allowing the respective sensor nodes to calculate a minimum hop count between themselves and the sink node using the positional information provided to the respective sensor nodes in combination with a transmission range of said sensor nodes, and the positional information of said sink node;

allowing a sensor nodes that wants to transmits a packet to the sink node to write its corresponding minimum hop count into said packet and then to broadcast the packet; and receiving the broadcast packet at the other sensor nodes and allowing the respective sensor nodes that received the packet to compare their minimum hop counts with the minimum hop count written into the packet, and if the minimum hop count of a receiving sensor node is smaller than the minimum hop count written into the packet, allowing the respective sensor node to write its minimum hop count into the packet and then broadcast the packet, and if the minimum hop count of the receiving sensor node is not smaller than the minimum hop count written into the packet, the receiving sensor node discards the packet;

said receiving step being repeated until the packet reaches the sink node.

2. A directional flooding method between a sink node and respective sensor nodes in a wireless sensor network in which the sink node is constructed to know a destination position to which a packet will be sent, comprising the steps of:

allowing the sink node to broadcast a packet with a central coordinate of a destination area, coordinates of the destination area, and a region flag indicating whether the packet reaches the destination area contained in the packet;

transmitting the packet sent by the sink node to the respective sensor nodes located within the destination area, and then allowing the sensor nodes located in the destination area to set the region flag if the region flag of the packet is not set; and allowing the respective sensor nodes that received the packet set in the region flag to broadcast the packet if the respective sensor nodes are located within the destination area, and to disregard the packet if the respective sensor nodes are not located within the destination area, wherein this step is repeated until the packet is transmitted to the respective sensor nodes located within the destination area.

3. The directional flooding method as claimed in claim 2, wherein the sink node is constructed to calculate a minimum hop count up to the destination area and to broadcast information on the minimum hop count with it included in a packet to be sent.

4. The directional flooding method as claimed in claim 3, wherein the respective sensor nodes located between the sink node and the destination area are constructed to compare a minimum hop count from the respective sensor nodes to the destination area and a minimum hop written into the packet, if the minimum hop counts of the sensor nodes are smaller than the minimum hop count written into the packet, the sensor nodes write their minimum hop counts into the packet and then broadcast the packet, and if the minimum hop counts of the sensor nodes are not smaller than the minimum hop count written into the packet, the sensor nodes discard a corresponding packet.

* * * * *